(12) United States Patent
Yokomori et al.

(10) Patent No.: US 7,574,828 B2
(45) Date of Patent: Aug. 18, 2009

(54) POWER SLIDING DEVICE OF VEHICLE SLIDING DOOR

(75) Inventors: Kazuhito Yokomori, Yamanashi-ken (JP); Shoji Wakatsuki, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 464 days.

(21) Appl. No.: 10/509,581

(22) PCT Filed: Mar. 31, 2003

(86) PCT No.: PCT/JP03/04111

§ 371 (c)(1), (2), (4) Date: Nov. 22, 2005

(87) PCT Pub. No.: WO03/086796

PCT Pub. Date: Oct. 23, 2003

(65) Prior Publication Data
US 2006/0143986 A1 Jul. 6, 2006

(30) Foreign Application Priority Data
Mar. 29, 2002 (JP) .............................. 2002-097084

(51) Int. Cl.
E05F 11/00 (2006.01)

(52) U.S. Cl. .......................... 49/358; 49/360

(58) Field of Classification Search .................. 49/358, 49/360; 296/155
See application file for complete search history.

(56) References Cited

U.S. PATENT DOCUMENTS

| 4,612,729 | A | * | 9/1986 | Sato ............................. 49/362 |
| 4,887,390 | A | * | 12/1989 | Boyko et al. .................. 49/214 |
| 6,530,619 | B2 | * | 3/2003 | Fukumoto et al. ........... 296/155 |
| 6,935,071 | B2 | * | 8/2005 | Yokomori et al. ............. 49/360 |
| 2004/0155617 | A1 | * | 8/2004 | Suzuki ........................ 318/434 |

* cited by examiner

Primary Examiner—Jerry Redman
(74) Attorney, Agent, or Firm—Browdy and Neimark, P.L.L.C.

(57) ABSTRACT

A powered sliding device comprises wire cables (21', 21") provided between a sliding door (11) and a vehicle body (10), and a power unit (20) for sliding the sliding door when the wire cables are moved by the power of a motor. The power unit is provided in the inner space of the sliding door. The wire cables are composed of the door-opening cable (21') and the door-closing cable (21") connected to the power unit at a base end side, respectively. A front end of the door-opening cable is fixed to the vicinity of the rear end of a lower rail (14) after having passed through a lower roller bracket (18) of the sliding door, and the front end of the door-closing cable is fixed to the vicinity of the front end of a center rail (16) after having passed though a center roller bracket (19) of the sliding door.

3 Claims, 5 Drawing Sheets

CLOSED STATE

OPEN STATE

CLOSED STATE

OPEN STATE

CLOSED STATE

OPEN STATE

POWER SLIDING DEVICE OF VEHICLE SLIDING DOOR

TECHNICAL FIELD OF THE INVENTION

The present invention relates to a powered sliding device of a vehicle sliding door.

BACKGROUND ART OF THE INVENTION

A powered sliding device of a vehicle sliding door including a sliding door slidably mounted on a guide rail provided on a vehicle body, a wire cable coupled to the sliding door, and a power unit for pulling the wire cable in a door-opening direction and a door-closing direction with a motor power so as to slide the sliding door in the door-opening direction and the door-closing direction is conventionally known.

FIGS. 1A and 1B show a conventional basic arrangement relationship of a vehicle body A and a sliding door B. A lower rail D is fixed in the vicinity of a lower part of an ingress/egress aperture C of the vehicle body A, and a center rail E is fixed on a quarter panel of the vehicle body A. When the ingress/egress aperture C is blocked with the sliding door B, the lower rail D is isolated from the outside of the vehicle with the sliding door B and protected from rainwater. However, the center rail E is substantially always exposed to the outside and is not protected from rainwater.

The sliding door B has a lower roller bracket F and a center roller bracket G which are slidably engaged with the lower rail D and the center rail E, respectively. The roller brackets F and G are pivotally mounted on the sliding door B, preferably. The sliding door B moves in the door-opening direction and the door-closing direction through the slidable engagement of the roller brackets and the rails.

The prior art powered sliding device is classified into four types in accordance with the arrangement position. FIGS. 2A and 2B show the first type (refer to U.S. Pat. No. 5,203,112). A power unit H of the first type powered sliding device is provided under the floor panel of the vehicle body in the vicinity of the ingress/egress aperture C. A wire cable J which moves the sliding door B with the power of the power unit H is substantively formed into a loop, passing through the lower rail D, and is coupled to the lower roller bracket F. With such configuration, the sliding door B is slidable with the movement of the wire cable J by the power of the power unit H.

In the second type device disclosed in U.S. Pat. No. 5,913,563, as shown in FIGS. 3A and 3B, the power unit H is provided in an interior space K of the quarter panel. The loop shaped wire cable J is passed through the center rail E, and is coupled to the center roller bracket G of the sliding door B.

In the third type device shown in FIGS. 4A and 4B, the power unit H is provided in the interior space K similar to the second type device (refer to U.S. Pat. No. 4,862,640). The wire cable of the third type device is divided into a door-opening cable J' and a door-closing cable J'', and the opening cable J' is guided by the lower rail D to be coupled to the lower bracket F of the sliding door B, and the closing cable J'' is guided by the center rail E to be coupled to the center bracket G of the sliding door B.

In the fourth type device, as shown in FIGS. 5A and 5B, the power unit H is provided inside the sliding door B (Japanese Patent Laid-Open No. 2001-336352). The wire cable of the fourth type device is also divided into the opening cable J' and the closing cable J''. The opening cable J' is fixed to a rear end portion of the center rail E by way of the center bracket G, and the closing cable J'' is fixed to a front end portion of the center rail E by way of the center bracket G.

In the first type device, an installation space for the power unit H must be defined under the floor panel of the vehicle body, and thus the first type device has a disadvantage that the vehicle interior space becomes narrow. Further, a path for the wire cable J which has to be provided under the floor panel narrows the vehicle interior space. In addition, since a part of nearly more than half of the wire cable J is difficult to be recognized by the eye or to touch it by the hand, it is difficult to carry out maintenance.

In the second type device, the power unit H is provided in the interior space K of the quarter panel, and thus the second type device has a disadvantage, similar to the first type device, that the vehicle interior space becomes narrow. Further, a pulley for guiding the wire cable J which has to be provided on each of the front and back ends of the center rail E further narrows the vehicle interior space. Additionally, in the second type device, even if the sliding door B is in the closed state, the wire cable J is permanently positioned in the center rail E over the entire length. The center rail E is, in effect, always exposed to the outside and thus is not protected from rainwater. Therefore, the second type device has a disadvantage that, due to the rainwater falling on the center rail E, the grease and the like applied to the wire cable J may come off, causing the quarter panel to be dirty. There is also a problem that dust may adhere on the wire cable J permanently positioned in the center rail E. In addition, similarly to the first type, since a part of nearly more than half of the wire cable is difficult to be recognized by the eye and to touch it by the hand, it is difficult to carry out maintenance.

In the third type device, if the sliding door B is in the closed state, the closing cable J'' is not, in effect, present in the center rail E, and thus problems of quarter panel becoming dirty, and dust adhering on the closing cable J'' are alleviated. However, the power unit H is provided in the interior space K of the quarter panel and a pulley must be provided at the front end of the center rail E to guide the closing cable J''. Thus, there is a disadvantage that the vehicle interior space becomes narrow, as in the first and the second type. In addition, since both of the door-opening cable J' and the door-closing cable J'' are difficult to be easily recognized by the eye and to touch them by the hand, it is troublesome to carry out maintenance, similarly to the first type and the second type.

In the fourth type device, the power unit H is provided inside the sliding door B, and there is no need to attach a pulley to the center rail E, and thus there is an advantage of effectively utilizing the vehicle interior space. However, even if the sliding door B is in the closed state, one part of the opening cable J' is permanently located in the center rail E, and thus the fourth type device has a disadvantage that the grease and the like applied to the opening cable J' may come off, causing the quarter panel to become dirty. There is also a problem of dust adhering on the door-opening cable J' that is permanently positioned in the center rail E.

BRIEF SUMMARY OF THE INVENTION

An object of the present invention is to provide an improved powered sliding device for overcoming the above-described conventional problems. To achieve this object, the device is configured such that a power unit is arranged within a sliding door, and a door-opening cable is fixed to a vehicle body through a lower rail, and a door-closing cable is fixed to the vehicle body through a center rail.

BEST MODE FOR CARRYING OUT THE INVENTION

Figure 1A:
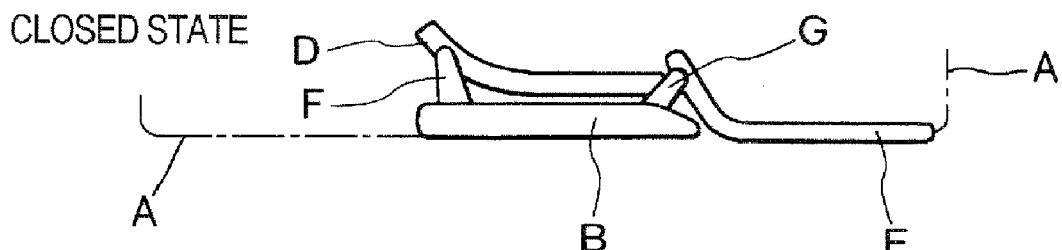
FIG. 1A is a view showing a conventional basic relationship between a vehicle body and a sliding door, in which the sliding door is in a closed state.
Figure 1B:
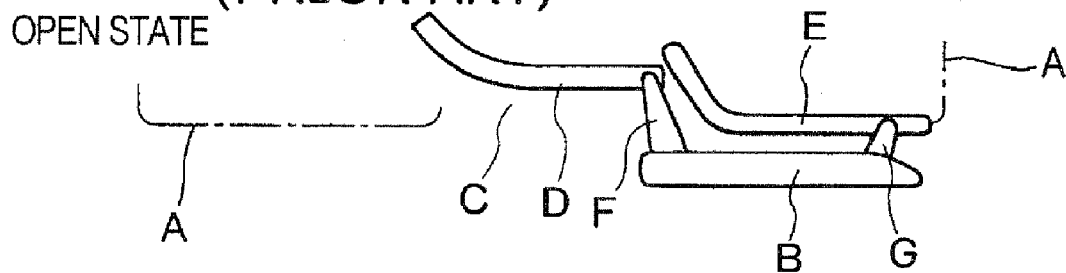
FIG. 1B is a view showing the conventional basic relationship between the vehicle body and the sliding door, in which the sliding door is in an open state.
Figure 2A:
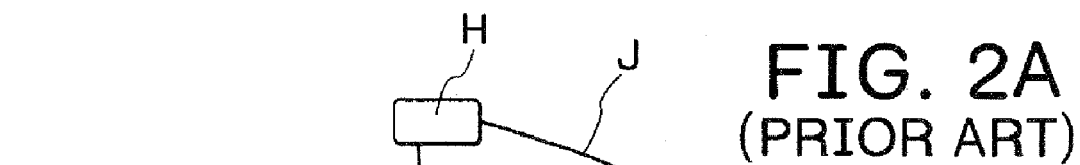
FIG. 2A is a view showing a first type of a conventional power unit and a wire cable, in which the sliding door in the closed state.
Figure 2B:
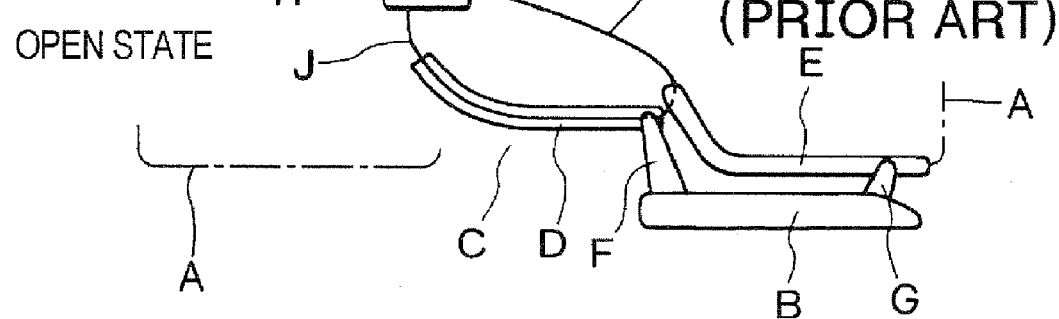
FIG. 2B is a view showing the first type of the conventional power unit and the wire cable, in which the sliding door in the open state.
Figure 3A:
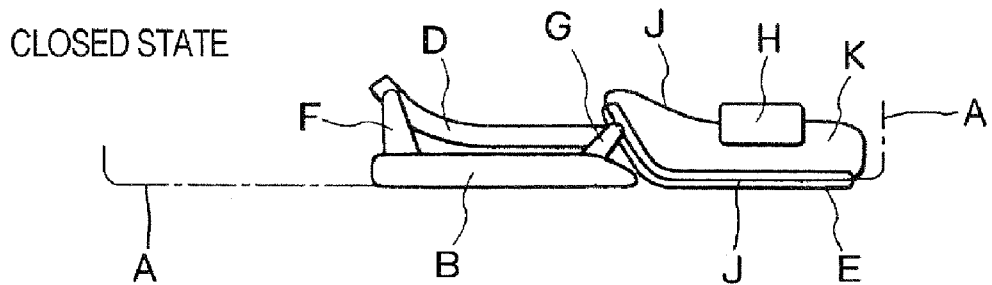
FIG. 3A is a view showing a second type of a conventional power unit and a wire cable, in which the sliding door in the closed state.
Figure 3B:
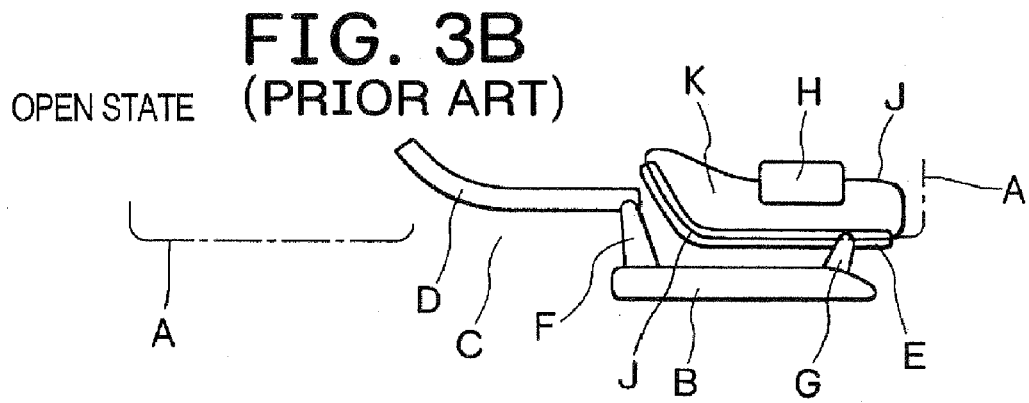
FIG. 3B is a view showing the second type of the conventional power unit and the wire cable, in which the sliding door in the open state.
Figure 4A:
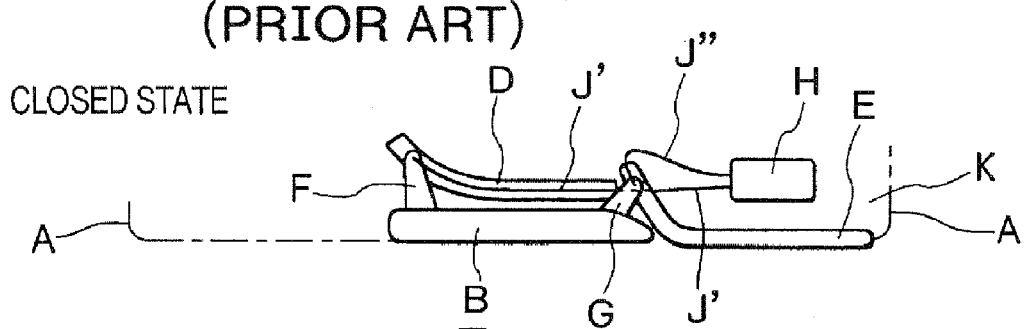
FIG. 4A is a view showing a third type of a conventional power unit and a wire cable, in which the sliding door in the closed state.
Figure 4B:
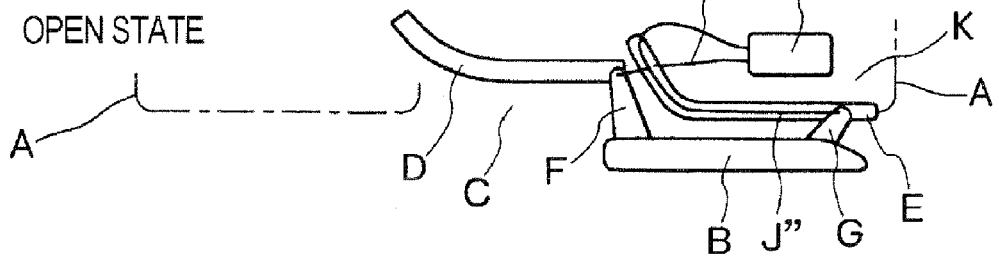
FIG. 4B is a view showing the third type of the conventional power unit and the wire cable, in which the sliding door in the open state.
Figure 5A:
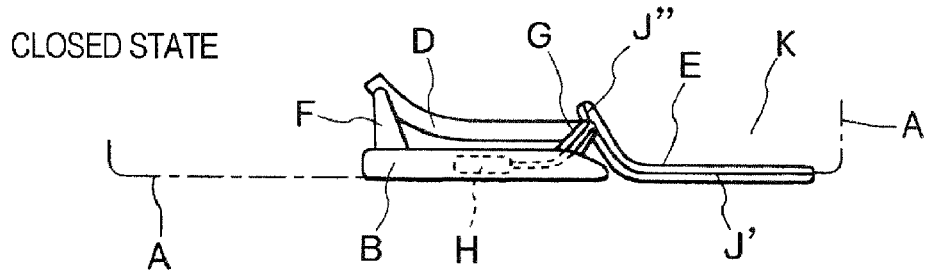
FIG. 5A is a view showing a fourth type of a conventional power unit and a wire cable, in which the sliding door in the closed state.
Figure 5B:
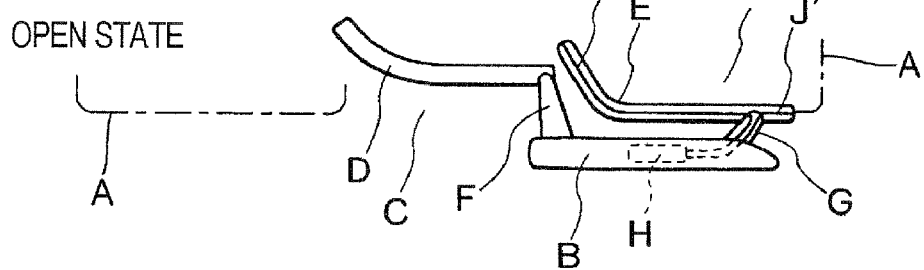
FIG. 5B is a view showing the fourth type of the conventional power unit and the wire cable, in which the sliding door in the open state.
Figure 6:
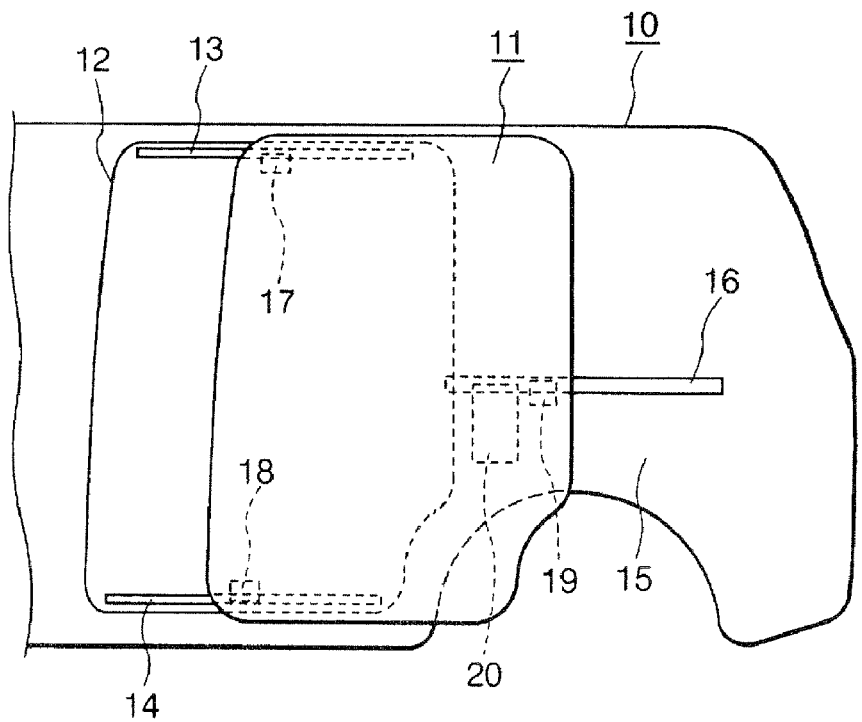
FIG. 6 is a side view of a vehicle provided with a powered sliding device according to the present invention.

The preferred embodiment of the present invention will now be explained with reference to the drawings. FIG. 6 shows a vehicle body 10, a sliding door 11 slidably attached to the vehicle body 10, and an ingress/egress aperture 12 which can be blocked by the sliding door 11. An upper rail 13 is fixed to the vehicle body 10 in the vicinity of an upper part of the ingress/egress aperture 12, a lower rail 14 is fixed to the vehicle body 10 in the vicinity of a lower part of the ingress/egress aperture 12, and a center rail 16 is fixed to a quarter panel 15 as a rear side panel of the vehicle body 10. When the ingress/egress aperture 12 is blocked by the sliding door 11, the upper rail 13 and the lower rail 14 are isolated from the outside of the vehicle by the sliding door 11 and protected from rainwater. However, the center rail 16 is substantively always exposed to the outside and thus is not protected from rainwater.

The sliding door 11 has an upper roller bracket 17, a lower roller bracket 18 and a center roller bracket 19 which are slidably engaged with the upper rail 13, the lower rail 14 and the center rail 16, respectively. The roller brackets 17, 18 and 19 are pivotally mounted on the sliding door 11, preferably. The sliding door 11 is movable in the door-opening direction and the door-closing direction through the slidable engagement of the roller brackets and the rails.

A power unit 20 having a motor power is provided in the inside space of the sliding door 11. The power unit 20 preferably includes a wire drum for winding and pulling out the wire cable. One end of each of the two wire cables, i.e., the door-opening cable 21' and the door-closing cable 21" is coupled to the wire drum. When the wire drum is rotated in the opening direction, the opening cable 21' is wounded, and the closing cable 21" is pulled out. When the wire drum is rotated in the closing direction, the opening cable 21' is pulled out and the closing cable 21" is wounded.

The door-opening cable 21' is pulled out toward the outside of the sliding door 11 from the lower position on the front side of the sliding door 11, namely, the position in the vicinity of the lower roller bracket 18. The lower roller bracket 18 is provided with a pulley 22 supported by a vertical shaft 22A. The door-opening cable 21' pulled out from the sliding door 11, after passing through the front side of the pulley 22, is guided to the back within the lower rail 14, and is fixed to the rear end portion of the lower rail 14 or to the vehicle body 10 in the vicinity of thereof. By this configuration, when the door-opening cable 21' is wound up by the wire drum, the sliding door 11 slides backward (in the door-opening direction) through the lower roller bracket 18.

The door-closing cable 21" is pulled out to the outside of the sliding door 11 from the central portion in the upper and lower direction of the rear side of the sliding door 11, i.e., the position in the vicinity of the center roller bracket 19. The center roller bracket 19 is provided with a pulley 23 supported by a vertical shaft 23A. The door-closing cable 21" pulled out of the sliding door 11, after passing through the rear side of the pulley 23, is guided to the front side within the center rail 16, and is fixed to the front end portion of the center rail 16 or to the vehicle body 10 in the vicinity of thereof. By this configuration, when the door-closing cable 21" is wound up by the wire drum, the sliding door 11 slides forward (in the door-closing direction) through the center roller bracket 19.

Figure 7:
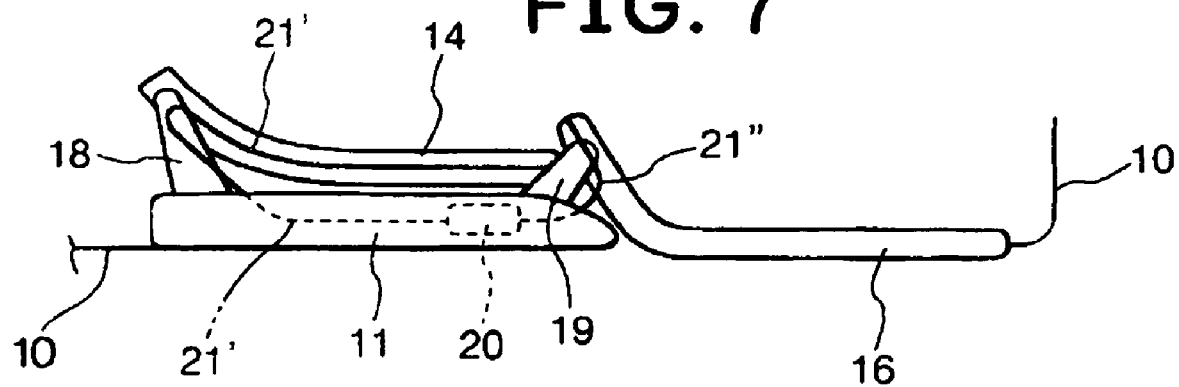
FIG. 7 is a view showing a relationship between a power unit and a wire cable of the powered sliding device, in which the sliding door in the closed state.
Figure 8:
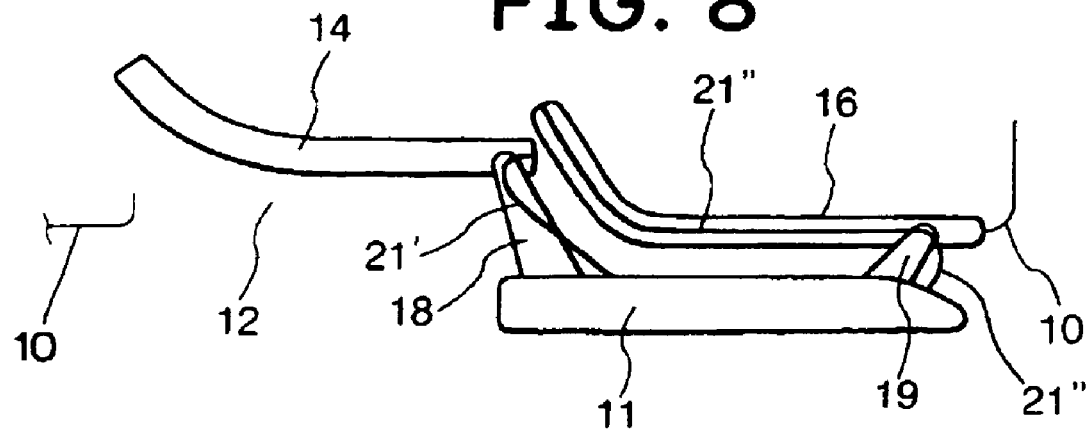
FIG. 8 is view showing the relationship between the power unit and the wire cable of the powered sliding device, in which the sliding door in the open state.
Figure 9:
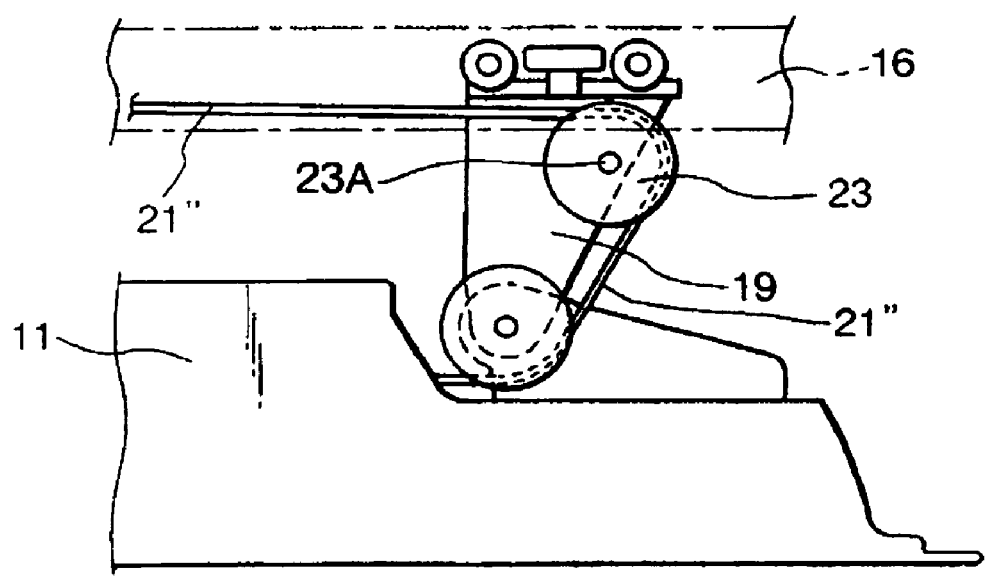
FIG. 9 is an enlarged plan view of a center rail and a center roller bracket of the sliding door.
Figure 10:
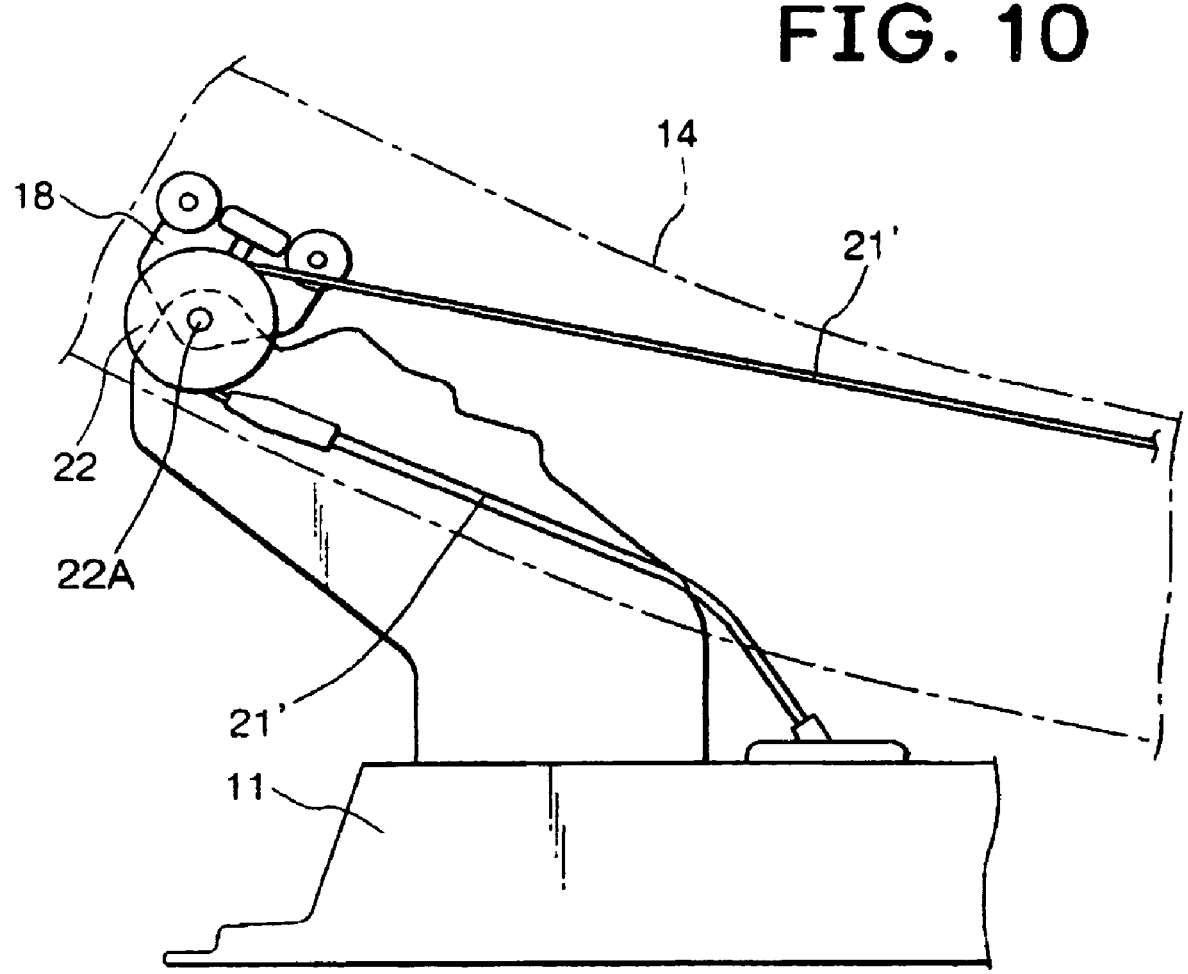
FIG. 10 is an enlarged plan view of a lower rail and a lower roller bracket of the sliding door.

The center bracket 19, when the sliding door 11 is closed, moves to the front end portion in the vicinity of the center rail 16. Hence, when one end of the door-closing cable 21" is fixed to the front end of the center rail 16 through the center bracket 19, in the door closed state of FIG. 7, the door-closing cable 21" within the center rail 16 can be substantially eliminated. Consequently, in the door-closed state, the falling of the rainwater directly on the door-closing cable 21" is prevented to a large extent, and the grease and the like adhered to the door-closing cable 21" are also substantially prevented from flowing out together with the rainwater to contaminate the quarter panel 15.

The power unit 20 of the present invention is provided in the inner space of the sliding door 11, and there is no need to mount the pulley on the center rail 16 and the lower rail 14 for guiding the wire cable of the power unit 20. Hence, the powered sliding device of the present invention does not make the inner space of the vehicle body narrow.

Further, the door-opening cable 21' is configured such that it makes an U-turn in the front side of the pulley 22 of the lower bracket 18 and is guided to the rear side within the lower rail 14, and the door-closing cable 21" is configured that it makes an U-turn in the rear side of the pulley 23 of the center bracket 19, and is guided to the front side within the center rail 14, and therefore, it is easy to check the cables 21' and 21" by visual observation and to check them by direct touching.

The invention claimed is:

1. A powered sliding device of a vehicle sliding door including a sliding door slidably mounted on a vehicle body in a forward door-closing direction and in a backward door-opening direction, a wire cable provided between the sliding door and the vehicle body, and a power unit for sliding the sliding door in the door-closing direction and in the door-opening direction by moving the wire cable by a motor power, comprising:

a lower roller bracket provided in a lower portion of a front side portion of the sliding door;

a center roller bracket provided in a rear side portion of the sliding door;

a lower rail, with which the lower roller bracket is slidably engaged, being provided near or at a lower part of an ingress/egress aperture of the vehicle body, said lower rail being isolated from an outside of the vehicle body when the sliding door is closed;

a center rail, with which the center roller bracket is slidably engaged, being provided on a quarter panel of the vehicle body, said center rail being not isolated from the outside of the vehicle body even when the sliding door is closed;

said power unit being provided in an inside space of the sliding door;

said wire cable including a door-opening cable and a door-closing cable, each of the door-opening cable and the door-closing cable having base side end, each of the base side ends being coupled to the power unit;

a distal end of the door-opening cable being protruded outside the sliding door from the front side portion of the sliding door, extended in a rearward direction within the lower rail by way of the lower roller bracket, and fixed to a position near or at a rear end of the lower rail;

a distal end of the door-closing cable being protruded outside the sliding door from the rear side portion of the sliding door, extended in a forward direction within the center rail by way of the center roller bracket, and fixed to a position near or at a front end of the center rail.

2. The powered sliding device of the vehicle sliding door according to claim 1, wherein a front pulley, against which the door-opening cable abuts, is mounted on the lower roller bracket by a vertical shaft.

3. The powered sliding device of the vehicle sliding door according to claim 1, wherein a rear pulley, against which the door-closing cable abuts, is mounted on the center roller bracket by a vertical shaft.

* * * * *